United States Patent [19]
Nobel et al.

[11] Patent Number: 5,578,182
[45] Date of Patent: Nov. 26, 1996

[54] ELECTROLYTIC PRODUCTION OF HYPOPHOSPHOROUS ACID

[75] Inventors: Fred I. Nobel, Sands Point, N.Y.; Daniel J. Vaughan, Wilmington, Del.

[73] Assignee: LeaRonal Inc., Freeport, N.Y.

[21] Appl. No.: 522,674

[22] Filed: Sep. 1, 1995

Related U.S. Application Data

[63] Continuation-in-part of Ser. No. 307,923, Sep. 16, 1994, Pat. No. 5,480,517.

[51] Int. Cl.$^6$ .................................................. C25B 1/22
[52] U.S. Cl. ............................................................ 204/531
[58] Field of Search ................................ 204/531, 522, 204/523, 529

[56] References Cited

U.S. PATENT DOCUMENTS

| | | |
|---|---|---|
| 5,225,052 | 7/1993 | Takikawa et al. |
| 5,258,109 | 11/1993 | Vaughan. |
| 5,264,097 | 11/1993 | Vaughan. |
| 5,419,821 | 5/1995 | Vaughan ......................... 204/522 |
| 5,431,792 | 7/1995 | Morgan ............................ 204/534 |

FOREIGN PATENT DOCUMENTS

| | | |
|---|---|---|
| 459751A1 | 12/1991 | European Pat. Off. . |
| 751856 | 7/1956 | United Kingdom . |

OTHER PUBLICATIONS

Makarov et al., Zasch. Met. 18(6), pp. 918–919 (1982) (Abstract).
Sadakov et al., Zasch. Met., 19(2), pp. 314–317 (1983) (Abstract).
Liaukonis et al., Issled. Obl. Osazhdeniya Met. (1985), pp. 134–9 (Abstract).
R. R. Pahud, Chimie & Industrie, vol. 87, No. 6, Jun. 1962, pp. 7590763, "L'acide hypophoreux et les hypophosphites" (No translation).
Patent Abstracts of Japan, vol. 18 No. 468 (C–1244), 31 Aug. 1994 & JP–A–06 145955 Canon Inc.) 17 May 1994, abstract.
Database WPI, Section Ch, week 9426, Derwent Publications Ltd., London, GB; Class D15, AN 94–211307; abstract No Date Available.

*Primary Examiner*—Kathryn Gorgos
*Assistant Examiner*—Brendan Mee
*Attorney, Agent, or Firm*—Lerner, David, Littenberg, Krumholz & Mentlik

[57] ABSTRACT

Methods for preparing hypophosphorous acid are disclosed comprising contacting an insoluble anode with an aqueous solution of hypophosphite anions and applying a current through the insoluble anode to a cathode in electrical contact with the aqueous solution to generate H+ ions in the aqueous solution thereby forming a hypophosphorous acid solution.

16 Claims, 2 Drawing Sheets

ELECTROLYTIC PRODUCTION OF HYPOPHOSPHOROUS ACID

CROSS-REFERENCE TO RELATED APPLICATIONS

The present application is a continuation-in-part of U.S. patent application Ser. No. 08/307,923, filed on Sep. 16, 1994, now U.S. Pat. No. 5,480,517.

FIELD OF THE INVENTION

The present invention relates to the manufacture of hypophosphorous acid. More particularly, the present invention relates to the manufacture of hypophosphorous acid for use in electroless nickel plating systems. Still more particularly, the present invention relates to the manufacture of hypophosphorous acid from an anolyte system including hypophosphite anions.

The present invention provides a significant improvement in the means by which hypophosphorous acid may be produced efficiently and inexpensively.

BACKGROUND OF THE INVENTION

Hypophosphorous acid ($H_3PO_2$) also known as phosphinic acid, is currently a staple article of commerce which is sold by various companies for purposes such as the manufacture of hypophosphite salts, as well as to prevent the discoloration of phosphate esters, in esterification catalysts, and for the manufacture of cooling water treatment chemicals. It is also sold for use in metal finishing procedures, as a reducing agent for electroless plating, and as a sealer for phosphated steel.

The manufacture of hypophosphorous acid, however, has generally been carried out by somewhat complex and expensive methods utilizing ion exchange procedures. In these procedures, for example, the sodium ion of sodium hypophosphite is exchanged for a hydrogen ion using an ion exchange resin therefor. These procedures result in hypophosphorous acid being a rather expensive commodity, generally at over $7.00 per pound.

By way of background, Liaukonis et al., *Issled. Obl. Osazhdeniya Met.* (1985), pp. 134–9 sets forth a detailed study of the anodic polarization of the Ni-P electrode in an acetate solution of hypophosphite as a function of the pH. Furthermore, in Makarov et al., *Zasch. Met.* 18(6) pp. 918–919 (1982) the rate dependence of hypophosphite anion oxidation and the evolution of hydrogen on titanium is investigated for sodium hypophosphite solutions. These authors thus describe the application of a current to titanium electrodes in contact with nickel hypophosphite solutions therein. In accordance with the disclosure of this article, a conventional electroless nickel bath is contained in a titanium tank and the article concerns the tendency of the bath to plate onto that tank. Furthermore, Sadikov et al., *Zasch. Met.*, 19(2), pp. 314–317 (1983), sets forth yet another investigation of the behavior of titanium hypophosphite electrolyte solutions.

Electrodialysis is also a known process which has been utilized for various purposes, such as that of U.S. Pat. No. 5,264,097. In that patent an alkali salt-containing aqueous solution including salts and complexes of metal anions and cations is fed to the catholyte, and the metal cations are removed therefrom as insoluble hydroxides by controlling the pH therein. In this process, the anions are transported across an anion permeable membrane into the anolyte, where they are converted to acids or halogens.

It is therefore of considerable interest to develop a novel and more economical method for producing hypophosphorous acid for the various uses discussed above.

SUMMARY OF THE INVENTION

In accordance with the present invention, a method has been discovered for preparing hypophosphorous acid which comprises electrodialysis using anionic and cationic exchange membranes to convert hypophosphite salts, such as alkali metal hypophosphite salts, into hypophosphorous acid and alkali hydroxide. These results are achieved by conducting electrodialysis through an insoluble anode in an anolyte, a product collection chamber electrolyte comprising hypophosphite ions, and a cathode and a catholyte comprising alkali (sodium) ions. Electrolysis of the water supplies hydrogen ions to the anolyte and to the product collection chamber, and hydroxyl ions to the catholyte.

In accordance with this invention, methods for preparing hypophosphorous acid are disclosed comprising providing an insoluble anode in an electrically conductive anolyte and a cathode in an electrically conductive catholyte, providing a hypophosphite salt solution separated from the anolyte anode by an anionic exchange membrane resistant to cation diffusion and from the catholyte by a cationic exchange membrane resistant to anionic diffusion, and applying a direct current through the insoluble anode to the cathode to transfer hypophosphite anions through the anionic exchange membrane into the anolyte and to generate hydrogen ions in the anolyte, thereby forming hypophosphorous acid in the anolyte. Preferably, the hypophosphite salt solution is an alkali metal hypophosphite salt solution. In a preferred embodiment, the insoluble anode comprises a precious metal-containing surface, such as platinum, iridium or ruthenium, or the oxides thereof. Most preferably, the insoluble anode includes an inert inner support for the precious metal surface, such as titanium, zirconium or tantalum.

In accordance with one embodiment of the method of the present invention, the solution of hypophosphite anions has a pH of below about 2.

In accordance with another embodiment of the method of the present invention, the cathode is comprised of stainless steel, steel, graphite, or platinum-coated titanium. In a preferred embodiment, the direct current is applied to the anode at a current density of between about 10 and 400 asf.

In a preferred embodiment of the method of the present invention, the hypophosphite salt solution comprises at least a 1 molar solution of hypophosphite anions.

In accordance with a preferred embodiment of the method of the present invention, the method includes an electrically conductive catholyte which comprises a dilute alkali metal hydroxide solution. Preferably, the alkali metal hydroxide solution comprises about a 0.1 molar solution of sodium hydroxide. In another embodiment, the electrically conductive anolyte is a dilute solution of hypophosphorous acid. Preferably, the hypophosphorous acid solution comprises a 0.05 molar solution of hypophosphorous acid.

In accordance with another embodiment of the method of the present invention, the method includes recovering the hypophosphorous acid, preferably comprising concentrating the hypophosphorous acid solution.

In accordance with a preferred embodiment of the method of the present invention, the hypophosphite salt solution is separated from the anode by a pair of anionic exchange membranes resistant to cation diffusion and from the cathode by a pair of cationic exchange membranes resistant to anion diffusion, thereby providing an anolyte buffer solution between the pair of anionic exchange membranes resistant to cation diffusion and a catholyte buffer solution between the pair of cationic exchange membranes resistant to anion diffusion.

In accordance with another embodiment of the present invention, the method for preparing hypophosphoric acid comprises providing an insoluble anode in an electrically conductive anolyte and a cathode in an electrically conductive catholyte, providing a hypophosphite salt solution separated from the catholyte by a first cationic exchange membrane resistant to anionic diffusion and from the anolyte by an anionic exchange membrane resistant to cationic diffusion and a second cationic diffusion membrane resistant to anionic diffusion, to thereby provide a product collection chamber between the second cationic exchange membrane and the anionic exchange membrane, and applying a direct current through the insoluble anode to the cathode to transfer hypophosphite anions through the anionic exchange membrane into the product collection chamber and to generate hydrogen ions in the anolyte and transfer the hydrogen ions through the cationic exchange membrane into the product collection chamber, thereby forming hypophosphorous acid in the product collection chamber.

BRIEF DESCRIPTION OF THE DRAWINGS

A more complete appreciation of the invention and many other intended advantages can be readily obtained by reference to the following detailed description when considered in connection with the following drawings, wherein.

Figure 1:
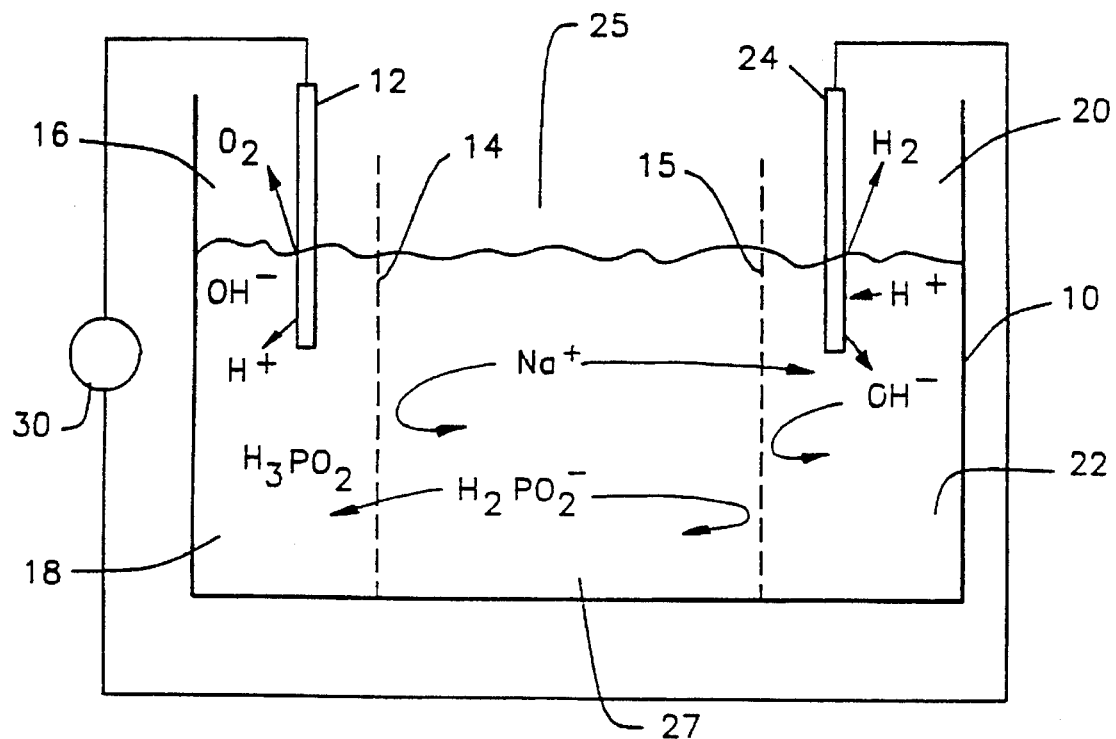
FIG. 1 shows a side, cross-sectional view of a three-compartment electrodialysis cell embodying the method of the present invention.

It should be noted that the drawings are not necessarily to scale, but that certain elements have been expanded to show more clearly the various aspects of the present invention and their advantages.

DETAILED DESCRIPTION

In its simplest form, the method of the present invention involves converting alkali hypophosphite salts into hypophosphorous acid and alkali (sodium) hydroxide by electrodialysis utilizing anionic and cationic exchange membranes. In particular, these results can be achieved by conducting electrodialysis through an insoluble anode and an anolyte, a product collection chamber and a product collection chamber electrolyte, and a cathode and a catholyte comprising alkali (sodium) ions. Electrolysis of the water supplies hydrogen ions to the anolyte and to the product collection chamber and hydroxyl ions to the catholyte.

The simplicity and effectiveness of the present invention is that much more surprising in view of the known fact that hypophosphite ions are a strong reducing agent which can be readily oxidized. Thus, it is quite surprising that the strong oxidizing power of the anode, as well as the liberation of a considerable amount of oxygen at the anode, does not result in oxidation of the hypophosphite ions when they are present in the anolyte, to either orthophosphite or phosphate ions. Although this is clearly what one of ordinary skill in this art would have expected, this oxidation does not take place in the method of the present invention. To the contrary, when the reaction takes place at the anode, destruction of the hypophosphite ions does not result. To the contrary, in this embodiment, the hypophosphite ions remain intact, and in the presence of hydrogen ions hypophosphorous acid can unexpectedly be produced in the anolyte compartment. On the other hand, when a separate product collection chamber is employed, hypophosphorous acid is produced in the product collection chamber electrolyte from the hypophosphite ions therein in combination with the hydrogen ions produced in the anolyte being supplied thereto.

In the embodiment of this invention where the hypophosphorous acid is collected in the anolyte, the solution of hypophosphite anions in contact with the insoluble anode can have a pH of less than about 0.5. Preferably, the pH of the solution is below about 2.

Essentially any cathode material is suitable for use as the counter-electrode. Examples of suitable cathode materials include stainless steel, steel, graphite, platinum-coated titanium, and the like. The preferred cathode material is stainless steel.

The anode materials suitable for use herein are insoluble in the aqueous hypophosphite anion solutions hereof. Examples of suitable insoluble anode materials include precious metal surfaces, such as platinum, iridium or ruthenium, and preferably precious metal surfaces on an inert inner support, the latter being a metal such as titanium, zirconium or tantalum. It is understood, however, that the precious metal surfaces can be in the form of an oxide of the precious metal, again such as the oxides of platinum, iridium or ruthenium. The preferred insoluble anode material is platinum-coated titanium.

Sufficient voltage should be supplied to the anode to create an anode current density between about 10 and about 400 amp/ft$^2$ (asf). A current density of between about 20 and about 200 asf is preferred, and a current density of between about 50 and 100 asf is most preferred.

With the application of current, oxygen is generated at the anode by oxidation of the hydroxyl ions in the water in which the hypophosphite anions are dissolved, thus leaving behind H+ ions, which build up within the anolyte compartments. At the same time, acid protons are displaced at the cathode, where they are liberated as hydrogen gas, with the generation of hydroxyl anions.

In order to carry out this method, a source of hypophosphite anions must be provided. A rather inexpensive commercial source of such anions are the alkali metal hypophosphites, such as sodium hypophosphite, potassium hypophosphite, and the like. Alkali metal hypophosphites may thus be used as a source of the hypophosphite anions in a three-compartment electrodialysis cell.

In such a three-compartment cell, such as that shown in FIG. 1, the middle compartment contains the alkali metal hypophosphite solution. The middle compartment is separated from the compartment containing the insoluble anode by an anionic exchange membrane resistant to cation diffusion, and from the compartment containing the cathode counter-electrode by a cationic exchange membrane resistant to anion diffusion. The solution in the center cell is an alkali hypophosphite solution which contains alkali ions and hypophosphite ions. Under the influence of a direct current which is applied through the system, these ions are separated. That is, the hypophosphite ions transfer through the anionic exchange membrane resistant to cation diffusion into the anolyte while the alkali ions transfer through the cationic exchange membrane resistant to anionic diffusion into the catholyte. The hypophosphite ions entering the anolyte combine with the hydrogen ions which are generated at the anode in the anolyte to produce hypophosphorous acid. On the other hand, the alkali ions entering the catholyte combine with hydroxyl ions generated at the cathode in the catholyte to produce alkali hydroxide. The overall reaction can next be simplified to produce hypophosphoric acid and sodium hydroxide from aqueous sodium hypophosphite.

Anionic ion exchange membranes resistant to cation diffusion include membranes such as R5030 brand available from the Pall Corporation. Cation ion exchange membranes resistant to anion diffusion include membranes available from DuPont under the brand name NAFION.

The anode compartment contains a solution known in the art as an anolyte, and the cathode compartment contains a solution known as a catholyte. Before the application of a DC voltage supplied by a rectifier, generator, or battery, both the anolyte and the catholyte must be made conductive so that current will begin to flow as soon as a voltage is applied. The anolyte should thus contain a dilute solution of hypophosphorous acid, and the amount needed in the anolyte is merely enough to render the solution conductive to an electric current. An amount of about 4 g/l or greater of hypophosphorous acid or the like is therefore sufficient. The anolyte should preferably start with a dilute solution of hypophosphorous acid, and not some other conducting salts or ions, because the anolyte should be kept free of extraneous ions that might interfere with the purity of the final product; namely, the hypophosphorous acid itself.

The catholyte can be made electrically conductive with any suitable conducting salt, provided only innocuous ions are introduced. Since the catholyte will eventually build up in alkali hydroxide due to the liberation of hydrogen gas at the cathode during electrolysis, an alkali metal hydroxide is the preferred starting material, generally up to about a 4 g/l solution of, for example, sodium hydroxide. Sodium hydroxide is thus preferred, and the amount required is merely enough to make the catholyte conductive to an electric current. About 5 g/l of sodium hydroxide is sufficient.

The concentration of hypophosphite salts such as alkali hypophosphite contained in the center compartment is not critical. It is, in fact, limited only by saturation at the upper end and by the need for electrical conductivity of the solution at the lower end. In addition, this solution can be replenished from time to time with additional alkali hypophosphite or the like during the electrodialysis. While the concentration of hypophosphite salt can vary widely, it is preferred to maintain the concentration at between 100 and 200 g/l.

The hypophosphite anions of the center compartment diffuse across the anionic exchange membrane resistant to cation diffusion to the anolyte, but are unable to diffuse across the cationic exchange membrane resistant to anion diffusion to the catholyte. Similarly, the alkali metal cation of the alkali metal hypophosphite is unable to diffuse across the anionic exchange membrane resistant to cation diffusion to the anolyte, but diffuses across the cationic exchange membrane resistant to anion diffusion to the catholyte.

When direct current is applied to the anode, the H+ ions are anodically generated into the anolyte, forming hypophosphorous acid solution with the hypophosphite anions from the center compartment. The anionic exchange membrane resistant to cation diffusion retains the H+ ions in the anolyte. Similarly, the hydroxyl anions generated at the cathode with the liberation of hydrogen gas are retained in the catholyte by the cationic exchange membrane resistant to anion diffusion.

Those of ordinary skill in this art will understand that electrodialysis cells having even greater numbers of compartments can be devised, sandwiching additional compartments, which may contain alkali metal hypophosphite or a buffer solution, between the insoluble anode compartment containing the above-described anolyte and the cathode counter-electrode compartment containing the above-described catholyte, which compartments are separated by the above-described ion exchange membranes. Such an arrangement allows for the large-scale highly efficient commercial production of hypophosphorous acid.

Figure 2:
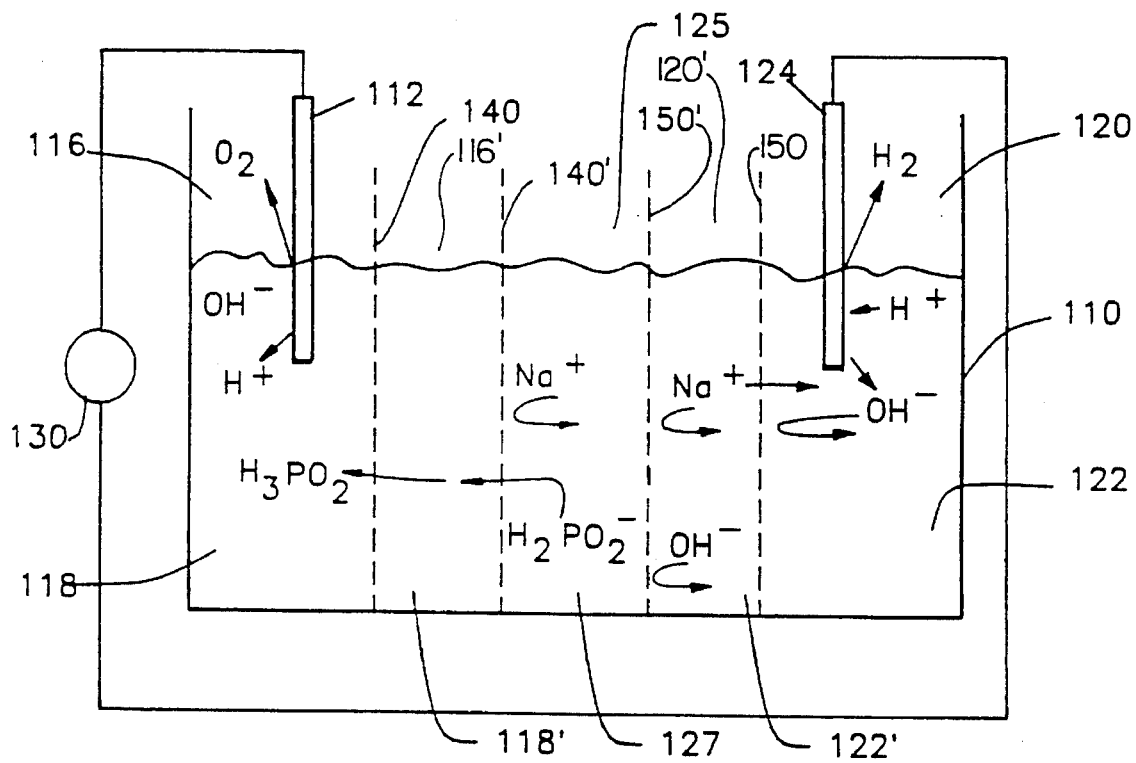
FIG. 2 shows a side, cross-sectional view of a five-compartment electrodialysis cell embodying the method of the present invention.

One example of a highly preferred embodiment of such a multi-compartment cell is shown in FIG. 2. It is known that ion exchange membranes used in electrodialysis are not 100% perfect, and that a small amount of undesired leakage can take place thereacross. For this reason, the five-compartment cell shown in FIG. 2 can be utilized. That is, when the hydroxyl ion concentration in the catholyte in the cell of FIG. 1 builds up to a sufficiently high value, a small amount of that hydroxyl ion can tend to leak across the cation exchange membrane into the center compartment. This, in turn, can adversely effect the pH in that compartment. Similarly, when the H+ concentration in the anolyte compartment builds up to a sufficiently high value, a small amount of these H+ ions can leak across the anion exchange membrane into the center compartment. This would represent an undesirable loss of a source of acid from the anolyte.

Referring to FIG. 2, buffer cells can be utilized to protect the center compartment. This is, by adding a second cationic exchange membrane to the first cationic membrane, a catholyte buffer cell is created between the catholyte compartment and the center compartment. Therefore, even in the case where the hydroxyl ion concentration in the catholyte compartment builds up to the extent that some leakage occurs into the catholyte buffer cell, since the hydroxyl ion concentration in the catholyte buffer cell would not build up to any significant extent, leakage of hydroxyl ion into the center compartment would be effectively prevented. In order to produce an operating cell, the catholyte buffer cell should include a starting solution which contained a dilute solution of electrically conductive innocuous ions just as in the case with the catholyte compartment as discussed above.

Similarly, by adding a second anionic exchange membrane to the first anionic exchange membrane, an anolyte buffer cell can be created between the anolyte compartment and the center compartment. In this case, even if the H+ ion concentration in the anolyte compartment built up to the extent that some leakage occurred into the anolyte buffer cell, since the H+ ion concentration in the anolyte buffer cell would not build up to a significant extent, leakage of H+ ions into the center compartment would be effectively prevented. In this case, as with the catholyte buffer cell, in order to produce an operating cell, the anolyte buffer cell should initially include a starting solution containing a dilute solution of electrically conducting ions of the type used in the anolyte compartment as discussed above.

Figure 3:
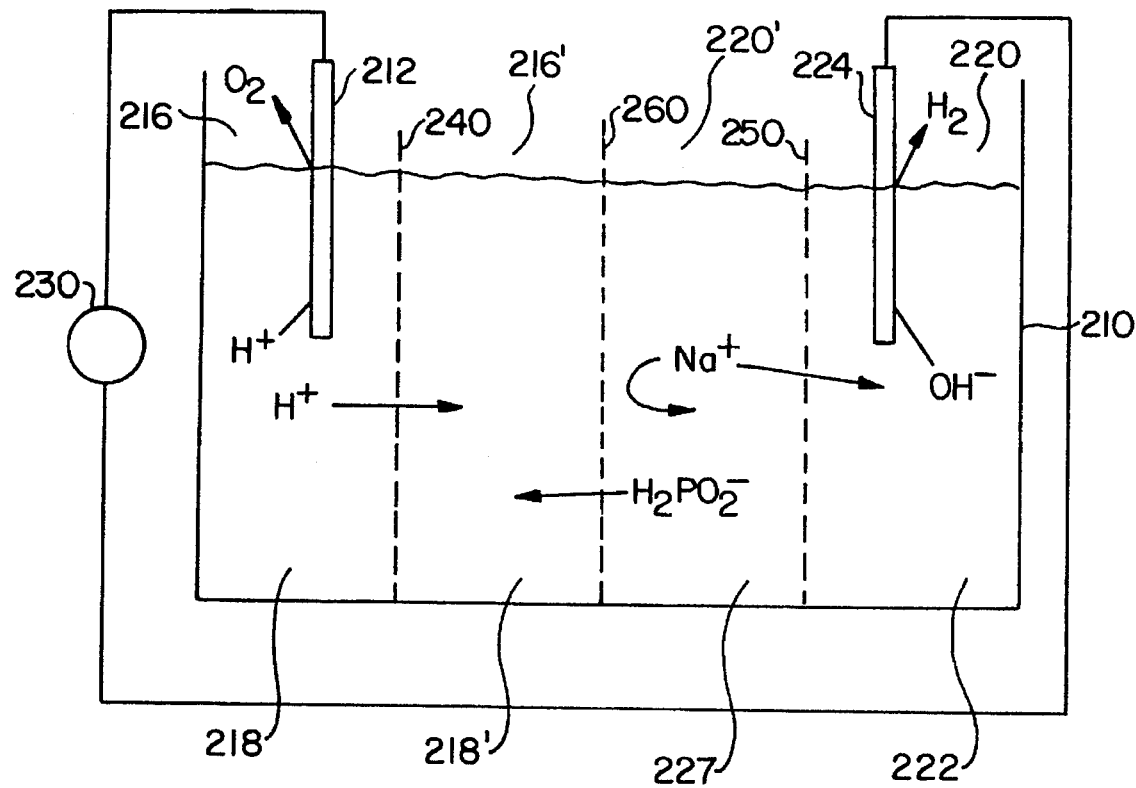
FIG. 3 shows a side, cross-sectional view of a four-compartment electrolysis cell embodying the method of the present invention.

A particularly highly preferred embodiment of a multi-compartment cell is shown in FIG. 3. In this embodiment, the hypophosphorous acid is not collected in the anolyte per se but in a separate chamber of the electrodialysis apparatus of the present invention. Thus, in this case, in a four-compartment cell a feed chamber 220' is provided adjacent to the catholyte instead of the center chamber 25 in FIG. 1. This feed chamber 220' thus contains the alkali metal hypophosphite solution. It is thus separated from the catholyte chamber by a cationic exchange membrane resistant to anion diffusion to the catholyte. Furthermore, the feed chamber is separated from a separate product cell or chamber for collection of the hypophosphorous acid, i.e., instead of in the anolyte, by a anionic exchange membrane resistant to cation diffusion from the feed cell. The product collection chamber is, in turn, separated from the anolyte cell by a second cationic exchange membrane resistant to anion diffusion from the product collection chamber.

In this manner, when direct current is applied to the anode, the H+ ions are anodically generated in the anolyte, and pass through the cationic exchange membrane into the product collection chamber. The presence of an anionic exchange membrane between the product collection chamber and the feed cell also prevents the H+ ions from passing from the product collection chamber into the feed cell. On the other hand, this anionic exchange membrane permits the hypophosphite anions to cross into the product collection chamber so that hypophosphorous acid solution is formed therein by combination of the hypophosphite anions and the H+ ions therein. On the other hand, hydroxyl ions generated at the cathode with the liberation of hydrogen gas are retained in the catholyte by the cation exchange membrane resistant to anion diffusion.

For each embodiment of the method of the present invention, the hypophosphorous acid is recovered by drawing off the solution in contact with the anode, i.e., the anolyte solutions of these electrodialysis cells. The hypophosphorous acid thus produced can be sold in solution form or concentrated therefrom.

In the electrodialysis cells, the hydroxyl ion concentration of the catholyte solution increases as the hypophosphorous acid solution is produced in the anolyte. Upon completion of the reaction, the catholyte solution may be discarded, or diluted for reuse. In electrodialysis cells containing three or more compartments, the concentration of the alkali metal hypophosphite compartment(s) decreases as the reaction progresses. This solution may be replenished and reused.

A three-compartment electrodialysis cell embodying the method of the present invention is depicted in FIG. 1. Anionic exchange membrane 14 and cationic exchange membrane 15 separate electrodialysis cell 10 into three compartments. Anolyte compartment 16 contains anolyte solution 18 in contact with insoluble anode 12. Catholyte compartment 20 contains catholyte solution 22 in contact with stainless steel cathode 24. Center compartment 25 contains a 200 g/l solution 27 of sodium hypophosphite. The anolyte solution 18 is a solution initially containing about 4 g/l $H_3PO_2$. Catholyte solution 22 is about a 5 g/l solution of NaOH.

The application of direct current from power source 30 anodically oxidizes $OH^-$ from the water in the aqueous anolyte solution 18, thus liberating oxygen at the insoluble anode 12 and generates H+ ions in the anolyte solution 18. Hypophosphite anions from the solution 27 in compartment 25 diffuse across membrane 14 to form hypophosphorous acid solution in anolyte solution 18 with the H+ ion generated anodically at the anode 12. Hydroxyl anions are generated at the cathode 24, with the liberation of hydrogen gas from the catholyte solution 22.

A five-compartment electrodialysis cell is depicted in FIG. 2. Anionic exchange membranes 140 and 140' and cationic exchange membranes 150 and 150' separate electrodialysis cell 110 into five compartments. Anolyte compartment 116 contains anolyte solution 118 in contact with insoluble anode 112. Anolyte buffer compartment 116' contains anolyte buffer solution 118'. Catholyte compartment 120 contains catholyte solution 122 in contact with stainless steel cathode 124. Catholyte buffer compartment 120' contains catholyte buffer solution 122'. Center compartment 125 contains a 200 g/l solution 127 of sodium hypophosphite. The anolyte solution 118 is a solution containing about 4 g/l $H_3PO_2$. Anolyte buffer solution 118' is a solution containing a dilute solution of hypophosphorous acid. Catholyte solution 122 is about a 5 g/l solution of NaOH. Catholyte buffer solution 122' is a dilute solution of alkali metal hydroxide.

A four-compartment electrodialysis cell is depicted in FIG. 3. Anionic exchange membrane 260 and cationic exchange membranes 240 and 250 separate the electrodialysis cell 210 into four compartments. Anolyte compartment 216 contains anolyte solution 218 in contact with insoluble anode 212. Product collection chamber 216' contains the hypophosphorous acid 218' produced in accordance with this invention. Catholyte compartment 220 contains catholyte solution 222 in contact with stainless steel cathode 224. Feed cell 220' contains a 200 g/l solution 227 of sodium hypophosphite. At the outset, product cell solution 218' preferably contains a dilute solution of hypophosphorous acid. Catholyte solution 222 is about a 5 g/l solution of sodium hydroxide. Anolyte solution 218 is preferably a solution of sulfuric acid. However, a large variety of anolytes can be utilized herein, so long as they are capable of carrying a current. These anolytes could therefore include the following salts: the phosphates, nitrates, sulphonates, or even the citrates and oxalates, all of which will produce oxygen at the anode. It is, in fact, even possible to use the chlorides, although these would obviously not be as desirable as they will produce chlorine gas at the anode.

The present invention satisfies a heretofore unmet need for a method by which hypophosphorous acid may be prepared from inexpensive raw materials. This reduces the cost of preparation of hypophosphorous acid.

The following examples illustrate particular conditions, steps and materials within the scope of this invention, it being understood that these examples are given only by way of illustration and not limitation.

EXAMPLES

Example 1—Three-Compartment Electrodialysis Cells

A 6×18×11 inch container was separated into three compartments essentially as depicted in FIG. 1 using a R 5030 anionic exchange membrane from Pall Corporation and a Nafion cationic exchange membrane from DuPont. The container thus had a center compartment between ionic exchange membranes, with an anionic exchange membrane between the anolyte solution compartment and the center compartment and a cationic exchange membrane between the catholyte solution compartment and the center compartment.

To the anolyte compartment 50% $H_3PO_2$ was added to provide an initial hypophosphite anion concentration of 10 g/l and a pH of 1.16. To the center compartment was added 4.0 L of a sodium hypophosphite solution having a concentration of 203.0 g/l and a pH of 5.3. To the catholyte solution compartment NaOH was added to form an NaOH solution having a concentration of 10.0 g/l. A platinized titanium mesh, insoluble anode having a dimension of 8"×5.75" was immersed in the solution in the anolyte compartment, and a stainless steel cathode having a dimension of 8"×5.75" was immersed in the solution in the catholyte compartment. All three solutions were at room temperature.

A direct current of 4.0 amps at 15 volts was supplied, providing an approximate anode current density of 18 asf. Oxygen was produced at the anode, and hydrogen gas was produced at the cathode. After 15 hours, the hypophosphite anion concentration in the anolyte compartment was 80 g/l, and the concentration of sodium hypophosphite in the center compartment was 129.0 g/l.

The center compartment was then replenished with 70 g/l of additional sodium hypophosphite.

After a total of 28 hours at a continued current of 4 amps, the reaction was stopped. Over the time of the reaction, a voltage drop from the initial 15 volts to 10 volts was experienced. The concentration of hypophosphite anions in the anolyte compartment was now 135 g/l. The solution was free, or substantially free, of orthophosphite anions. The pH had decreased to 0.5.

In the center compartment, the sodium hypophosphite concentration had decreased to 153.0 g/l and the pH had decreased from 5.3 to 1.9.

Example 2

In a second experiment, the same container was separated into three compartments in essentially the same manner as discussed above. In this case, to the anolyte compartment hypophosphorous acid was initially added to provide a hypophosphite anion concentration of 13.8 g/l at a pH of 1.0. To the center compartment was added 4.0 L of a sodium hypophosphite solution having a concentration of 190 g/l and a pH of 4.6. To the catholyte solution compartment, NaOH was added to form an NaOH solution having a concentration of 10 g/l. Cathodes having the dimensions in the experiment discussed above were again utilized and all three solutions were at room temperature. The platinized titanium mesh anode was reduced in size to provide a high anode current density.

A direct current of 4.5 amps was supplied, providing an anode current density of approximately 100 asf.

After seven hours, the reaction was stopped. The volume of the solution in the anolyte compartment had increased from 1.2 to 1.4 L. The pH had decreased from 1.0 to 0.75. The hypophosphite anion concentration had increased from 13.8 g/l to 65 g/l. The solution was free, or substantially free, of orthophosphite anions.

In the center compartment, the volume of the solution was maintained the same, namely, 4.0 L. The sodium hypophosphite concentration had decreased from 190 g/l to 167.0 g/l. The pH had decreased from 4.6 to 2.86.

Example 3

In a third experiment, the container was separated into four compartments (each containing about 1.7 liters), essentially as depicted in FIG. 3, using an R 5030 anionic exchange membrane from Pall Corporation as the center membrane, and a pair of Nafion cationic exchange membranes from duPont. In this case, to the anolyte compartment sulfuric acid was initially added to provide a concentration of 100.0 ml/l. To the compartment adjacent to the anolyte compartment, hypophosphorous acid was initially added to provide a hypophosphite anion concentration of 11.9 g/l (via titration as sodium hypophosphite) at a pH of 1.35. To the catholyte compartment, NaOH was added to form a NaOH solution having a concentration of 10.0 g/l. Finally, to the compartment adjacent to the catholyte compartment was added a sodium hypophosphite solution having a concentration of 159.0 g/l and a pH of 5.36. Electrodes of the type discussed in Example 1 were utilized and all of the solutions were at room temperature.

A direct current of 8.5 amps at 20 volts was supplied, providing an anode current density of approximately 30 asf.

After seven hours, the reaction was stopped. Over the time of the reaction, a voltage drop from the initial 20 volts to 10 volts was experienced. The hypophosphite ion concentration in the compartment adjacent to the anolyte compartment had increased from 11.9 g/l to 117.4 g/l. The pH had decreased from 1.35 to 0.65. In the compartment adjacent to the catholyte compartment the sodium hypophosphite concentration had decreased from 159.0 g/l to 53.0 g/l. The pH had increased from 5.36 to 9.6.

The foregoing examples demonstrate the high efficiency at which hypophosphorous acid may be produced from inexpensive raw materials by the method of the present invention. As will be readily appreciated, numerous various and combinations of the features set forth above can be utilized without departing from the present invention as set forth in the claims. Such variations are not to be regarded as a departure from the spirit and scope of the invention, and all such modifications are intended to be included within the scope of the following claims.

We claim:

1. A method for preparing hypophosphorous acid comprising the steps of:

providing an insoluble anode in an electrically conductive anolyte and a cathode in an electrically conductive catholyte, providing a hypophosphite salt solution separated from said catholyte by a first cationic exchange membrane resistant to anionic diffusion and from said anolyte by an anionic exchange membrane resistant to cationic diffusion and a second cationic exchange membrane resistant to anionic diffusion, to provide a product collection chamber defined by said second cationic exchange membrane and said anionic membrane, and applying a direct current through said insoluble anode to said cathode to transfer hypophosphite anions through said anionic exchange membrane into said product collection chamber and to generate hydrogen ions in said anolyte and transfer said hydrogen ions generated in said anolyte through said second cationic exchange membrane into said product collection chamber, thereby forming hypophosphorous acid in said product collection chamber from said hydrogen ions generated in said anolyte and said hypophosphite anions.

2. The method of claim 1 wherein said hypophosphite salt solution comprises an alkali metal hypophosphite salt solution.

3. The method of claim 1 wherein said insoluble anode comprises a precious metal-containing surface.

4. The method of claim 3 wherein said precious metal-containing surface is selected from the group consisting of platinum, iridium and ruthenium, and the oxides thereof.

5. The method of claim 4 wherein said insoluble anode includes an inert inner support for said precious metal-containing surface.

6. The method of claim 5 wherein said inert inner support comprises a metal selected from the group consisting of titanium, zirconium and tantalum.

7. The method of claim 1 wherein said cathode is selected from the group consisting of stainless steel, steel, graphite, and platinum-coated titanium.

8. The method of claim 1 wherein said direct current is applied to said anode at a current density of between about 10 and about 400 amps per square foot.

9. The method of claim 8, wherein said direct current is applied to said anode at a current density of between about 20 and about 200 amps per square foot.

10. The method of claim 1, wherein said electrically conductive anolyte comprises a solution of sulfuric acid.

11. The method of claim 1 wherein said hypophosphite salt solution has a concentration of between about 100 and 200 grams of said hyposphite salt per liter (g/l).

12. The method of claim 1 wherein said electrically conductive catholyte comprises an alkali metal hydroxide solution.

13. The method of claim 1 further comprising the step of recovering said hypophosphorous acid.

14. The method of claim 13 wherein said step of recovering said hypophosphorous acid comprises the step of concentrating said hypophosphorous acid from said product collection chamber.

15. The method of claim 1 wherein said anolyte is contained in an anolyte compartment, and wherein said product collection chamber is adjacent to said anolyte compartment.

16. The method of claim 1 wherein said hypophosphite salt solution is contained in a salt chamber defined by said first cationic exchange membrane and said anionic exchange membrane, said catholyte is contained in a catholyte chamber, and wherein said salt chamber is adjacent to said catholyte chamber.

* * * * *